United States Patent [19]

Alf et al.

[11] 4,178,760
[45] Dec. 18, 1979

[54] FILTER DUST EJECTOR AND CHECK VALVE ARRANGEMENT IN EXHAUST SYSTEM OF INTERNAL COMBUSTION ENGINE

[75] Inventors: Herbert Alf, Ludwigsburg; Fritz Bussinger, Grossachsenheim, both of Fed. Rep. of Germany

[73] Assignee: Filterwerk Mann & Hummel GmbH, Ludwigsburg, Fed. Rep. of Germany

[21] Appl. No.: 856,413

[22] Filed: Nov. 30, 1977

[30] Foreign Application Priority Data

Dec. 2, 1976 [DE] Fed. Rep. of Germany ... 7636707[U]

[51] Int. Cl.² .............................................. F01N 5/04
[52] U.S. Cl. ........................................ 60/319; 55/432; 137/527; 417/191
[58] Field of Search ................... 60/319; 55/431, 432; 137/520, 521, 527, 527.8; 417/190, 191, 159

[56] References Cited

U.S. PATENT DOCUMENTS

| 194,676 | 8/1877 | Hansen | 137/527 |
|---|---|---|---|
| 287,413 | 10/1883 | Bodine | 137/527.8 |
| 1,372,147 | 3/1921 | Lang | 417/191 |
| 1,692,916 | 11/1928 | Woodruff | 417/191 |
| 2,080,622 | 5/1937 | McMahon | 417/191 |
| 3,104,962 | 9/1963 | Duer | 55/431 |
| 3,391,645 | 7/1968 | Koza | 137/527 |
| 3,419,892 | 12/1968 | Wagner | 60/319 |
| 3,421,666 | 1/1969 | Lawson | 55/432 |
| 3,816,982 | 6/1974 | Regnault | 55/432 |

FOREIGN PATENT DOCUMENTS

12303 6/1911 United Kingdom .................... 417/191

*Primary Examiner*—Douglas Hart
*Attorney, Agent, or Firm*—Joseph A. Geiger

[57] ABSTRACT

A filter dust ejector with a built-in check valve as part of the exhaust system of an internal combustion engine, the ejector consisting of an ejector housing with a suction connector for an air hose leading to the air intake filter, and inlet and outlet pipes forming an annular suction gap in a venturi-type exhaust flow profile, thereby creating a negative pressure in the ejector housing. The inner extremity of the suction connector is a valve seat for a pivotably supported flapper serving as a check valve which is closed, when a pressure condition in the ejector housing tends to create a reverse flow of exhaust gas through the suction connector to the air intake filter.

7 Claims, 3 Drawing Figures

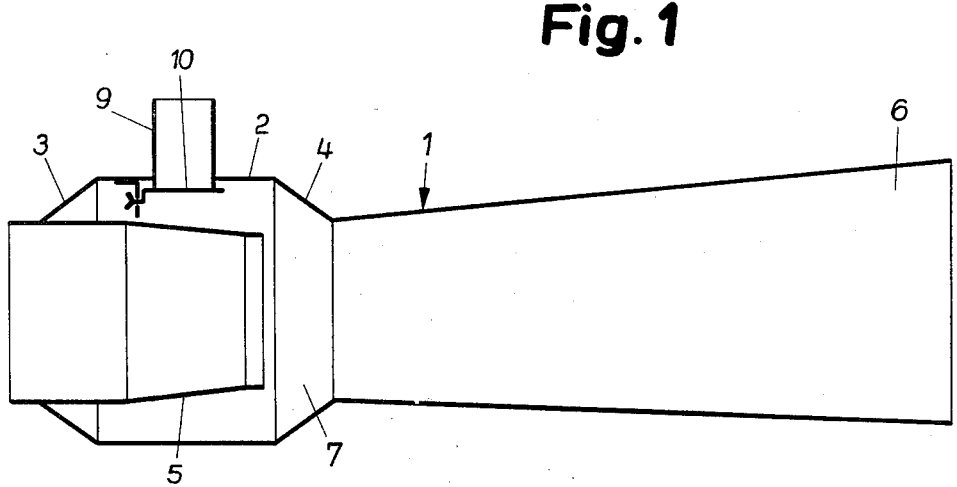
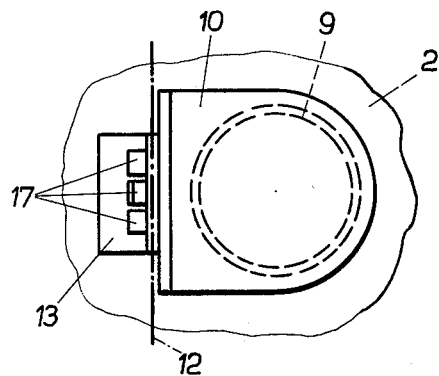
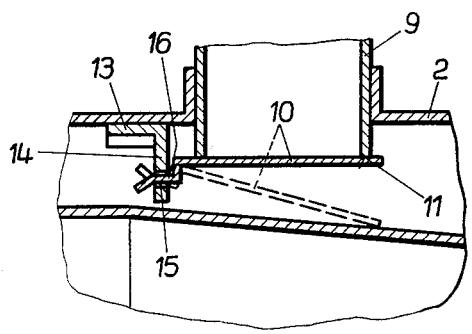

FILTER DUST EJECTOR AND CHECK VALVE ARRANGEMENT IN EXHAUST SYSTEM OF INTERNAL COMBUSTION ENGINE

BACKGROUND OF THE INVENTION

1. Field of the Invention

The present invention relates to internal combustion engines, and, more particularly, to an exhaust system for an internal combustion engine which includes an ejector device, for the creation of a negative pressure which draws dust-laden air from the air intake filter of the internal combustion engine.

2. Description of the Prior Art

Ejector devices of the type referred to above are known from the prior art. In general, they take advantage of the flow speed of the exhaust gas, using a venturi-type flow pipe arrangement in the exhaust system to create a negative pressure which, when connected to the air intake filter of the internal combustion engine, draws dust-laden air from the latter into the exhaust system.

Under certain operating conditions, it may happen that, instead of the desired negative pressure, the ejector device in the exhaust system briefly produces a positive pressure, or a negative pressure so weak that it is overcome by the negative pressure inside the air intake filter. When this happens, hot exhaust gas will flow to the air filter, carrying with it exhaust impurities and particulate matter.

In order to prevent such a reverse flow to the air intake filter, it has already been suggested that the filter should be equipped with a check valve. Such an arrangement has the advantage of determining a single, unchangeable mounting arrangement of the check valve, so that the pivot axis of the valve element is always oriented in the same way, horizontally, for example. This feature, by preventing other orientations of the pivot axis, under which the valve operation is a different one, increases the operational reliability of the system. A disadvantage of this prior art arrangement is that it requires a modified air filter assembly, specially adapted for use with an ejector device. This reflects itself in higher costs of production and spare parts distribution, because separate air filter assemblies must be stocked for combustion engines which have an ejector device and for those not equipped with such a device.

One way of overcoming the aforementioned problem is suggested in U.S. Pat. No. 3,419,892. This prior art solution suggests the arrangement of a check valve in the form of a separate subassembly enclosed within a housing which is mounted in the hose connection between the air intake filter and the ejector device, in the vicinity of the filter housing. The need for a separate housing and for suitable connectors on both sides of the housing means that this is likewise a costly solution.

SUMMARY OF THE INVENTION

Underlying the present invention is therefore the objective of providing a filter dust ejector and check valve arrangement which is free of the aforementioned prior art shortcomings in that it allows for the use of a standardized air intake filter on the internal combustion engine, while being simple and very economical to produce.

The present invention proposes to attain this objective by suggesting a filter dust ejector designed for incorporation in the exhaust system of an internal combustion engine and for connection to a regular air intake filter, the ejector assembly comprising a housing, a tubular suction connector opening into the housing, and a check valve associated with the suction connector in such a way as to ensure that the latter is closed, in the event of a pressure condition in the ejector housing which would tend to create a reverse flow of gas through the suction connector.

In a preferred embodiment of the invention, the ejector assembly includes an inlet pipe which extends a distance into a larger concentric ejector housing so as to form an annular suction gap with the downstream opening of the latter, a coaxially aligned outlet pipe being connected to this downstream opening. The inner wall of the ejector housing leading to its downstream opening and the inner wall of the connected outlet pipe are so shaped that they define a venturi-type flow profile, creating a negative pressure in the annular suction gap and in the ejector housing.

The invention further suggests that the check valve be preferably a flapper valve which is arranged inside the ejector housing, and that the inner extremity of the suction connector serve as a valve seat for the pivotable flapper. For this purpose, the suction connector is preferably so arranged that it extends a short distance radially into the ejector housing. The support for the pivotable flapper is preferably provided by a suitable supporting bracket mounted inside the ejector housing, and the pivot connection is preferably in the form of a tongue on the flapper which engages a slot in the flapper support bracket with movement clearance.

The configuration of the ejector housing is preferably such that the annular suction space between the inlet pipe and the ejector housing is large enough for an opening movement of the pivotable flapper, but small enough to limit the opening movement of the flapper to a gap which, as soon as a reverse flow of exhaust gas into the suction connector is initiated, produces a pressure drop across said gap, thereby causing the flapper to close immediately. This preferred arrangement presumes a position of the check valve in which the flapper is normally in the open position, thereby minimizing the air flow resistance from the air intake filter to the ejector outlet pipe.

Alternatively, the check valve may be so arranged that it is normally held closed, under the influence of gravity, or by a suitable valve closing spring. This arrangement requires a certain minimal level of negative pressure, in order to open the flapper of the check valve.

BRIEF DESCRIPTION OF THE DRAWING

Further special features and advantages of the invention will become apparent from the description following below, when taken together with the accompanying drawing which illustrates, by way of example, a preferred embodiment of the invention, represented in the various figures as follows:

FIG. 1 is a somewhat schematic longitudinal cross section through a filter dust ejector with a built-in check valve, representing a preferred embodiment of the invention;

FIG. 2 shows, in enlarged cross-sectional detail, the check valve and surrounding ejector portions of FIG. 1; and FIG. 3 shows the check valve detail of FIG. 2, as seen in the direction of arrow A.

DESCRIPTION OF THE PREFERRED EMBODIMENTS

Referring to FIGS. 1-3 of the drawing, there is shown a filter dust ejector with a built-in check valve, designed to form a part of the exhaust system of an internal combustion engine. The ejector 1 consists essentially of four tubular components: a generally cylindrical ejector housing 2 with conically converging housing end portions 3 and 4, an inlet pipe 5 connected to the upstream opening of the ejector housing 2 and reaching a distance into the latter, an outlet pipe 6 connected to the downstream opening of the ejector housing 2 in coaxial alignment with the inlet pipe 5, and a suction connector 9 opening radially into the ejector housing 2. In operation, the upstream extremity of the inlet pipe 5 is connected to the exhaust line of an internal combustion engine.

The conical end portions 3 and 4 of the ejector housing 2 are preferably so designed that their respective upstream and downstream openings to which are connected the inlet and outlet pipes 5 and 6, respectively, have substantially the same diameter. The inlet pipe 5 has a very slight converging taper, in the manner of a jet nozzle, forming an annular suction gap 7 with the downstream opening of the ejector housing to which the outlet pipe 6 is attached. The latter has a diverging taper in the downstream sense.

The ejector housing 2, with its convergingly tapered end portion 4 and the outlet pipe 6 with its slightly divergingly tapered shape thus form a venturi-type flow profile which has its neck located immediately adjacent to the annular suction gap 7. It follows that, according to the well-known characteristics of a venturi pipe, a negative pressure is created in the annular suction gap 7 by a gas flow through the coaxially aligned inlet and outlet pipes 5 and 6.

The radially oriented suction connector 9 of the ejector housing 2 is designed for connection to the air intake filter of the internal combustion engine, via a suitable air hose or air pipe (not shown). The suction connector 9 is preferably so arranged that it reaches a short distance inwardly beyond the wall of the ejector housing 2, so that the entire circumference of its inner extremity lies within the annular suction space between the intake pipe 5 and the ejector housing 2, thereby forming a valve seat 11 for the flat pivoting flapper 10 of a check valve.

As can be seen in FIG. 2, the flapper 10 is pivotably supported on the upstream side of the suction connector 9 by means of an angular supporting bracket 13. This pivot connection defines a pivot axis 12 (FIG. 3) which is substantially perpendicular to the longitudinal axis of the ejector assembly 1 and parallel to a plane defined by the valve seat 11, at the inner extremity of the suction connector 9.

The pivot connection between the supporting bracket 13 and the flapper 10 consists of a slot 15 in the free leg portion 14 of the bracket 13 and of a loosely fitting tongue 16 of the flapper 10 reaching through the pivot slot 15. An offset portion of the flapper adjacent to its tongue 16 and three bending tabs 17 secure the flapper position on opposite sides of the leb portion 14. As can be seen in FIGS. 2 and 3, the outer ones of the three bending tabs 17 are bend radially outwardly, towards the base of the supporting bracket 13, while the tab in between is bent-over in the opposite direction. The result is a somewhat loose pivot connection which gives the valve flapper 10 adequate opening mobility within a space delimited by the valve seat 11 and by the outer diameter of the inlet pipe 5. This flapper valve is maintenance-free and can therefore be mounted inaccessibly inside the ejector housing 2.

The present invention allows for the orientation of the suction connector 9 in any direction, meaning that the pivot axis 12 of the flapper 10 may be arranged either vertically or horizontally and above the inlet pipe 5, or also horizontally and below the inlet pipe 5. The three alternatives produce correspondingly different effects of gravity on the rest position of the flapper 10. It is, of course, possible to add to the flapper a suitable spring, if the effect of gravity is to be neutralized or overcome. In all cases, the negative pressure created inside the ejector housing 2, by exhaust gas flowing through its inlet and outlet pipes 5 and 6, is of a magnitude which will open the flapper valve, if it is not normally held open by gravity.

In a situation, where the rest position of the flapper valve is the open position, the flapper 10 rests against the inlet pipe 5. The maximum angle of check valve opening is thereby held small enough that a reverse flow from the ejector housing 2 into the suction connector 9 and towards the air intake filter creates a pressure drop across the gap between the flapper 10 and the seat 11 of the check valve, so as to immediately pull the flapper 10 closed. This closed position is shown in FIG. 2, in full lines, the open flapper position being shown in dotted lines.

The check valve thus insures that the suction connector is closed, in the event of a reverse flow pressure condition in the ejector housing 2, regardless of whether the rest position of the flapper 10 is an open or a closed one. The check valve thus prevents any accidental flow of hot exhaust gas, with its gaseous and particulate impurities, to the air intake filter.

Under operation of the internal combustion engine, the flapper 10 is held open by the negative pressure inside the ejector housing 2, regardless of the assisting or opposing effect of gravity. Dust-laden air is then drawn from the air intake filter into the ejector, where, passing through the suction gap 7, it enters the flow of exhaust gas, to be ejected with the latter to the atmosphere.

It should be understood, of course, that the foregoing disclosure describes only a preferred embodiment of the invention and that it is intended to cover all changes and modifications of this example of the invention which fall within the scope of the appended claims.

We claim the following:

1. A filter dust ejector designed for incorporation in the exhaust system of an internal combustion engine and for connection to its air intake filter, so that a negative pressure created by engine exhaust gas in the ejector draws dust-laden air from the filter into the exhaust system, for discharge with the exhaust gas, said filter dust ejector comprising in combination:

an ejector housing defining a longitudinal flow axis and having an upstream opening and a downstream opening on opposite axial extremities;

an inlet pipe extending into the ejector housing from the upstream opening thereof so as to define an annular suction space between it and the wall of the ejector housing, the inlet pipe having an open downstream extremity located a short axial distance from the downstream opening of the ejector housing, thereby forming an annular suction gap therewith;

an outlet pipe connected to and extending away from the downstream opening of the ejector housing; the wall portion of the ejector housing which leads to said downstream opening and the wall of the connected outlet pipe being so shaped that they define a venturi-type flow profile, so that a gas flow from the inlet pipe to the outlet pipe creates a negative pressure in the annular suction gap and, consequently, in the suction space of the ejector housing;

a suction connector in the form of a length of pipe which protrudes a short distance into the suction space of the ejector housing and serves as an inlet for said dust-laden air drawn from the filter; and check valve means arranged inside the ejector housing and associated with the suction connector, the check valve means being operable to close the suction connector, in the event of a pressure condition in the suction space of the ejector housing tending to create an outflow of gas through the suction connector; and wherein said check valve means includes:

a valve seat on the inwardly protruding extremity of the suction connector; and a pivotable flapper cooperating with the valve seat, the pivot axis of the flapper being located outside the suction connector, on the axially upstream side thereof within the ejector housing, and oriented perpendicularly to a plane which includes the axes of the suction connector and of the ejector housing.

2. A filter dust ejector as defined in claim 1, wherein
the check valve means further includes a supporting bracket which is fixedly mounted inside the suction space of the ejector housing and which pivotably supports the flapper; and
the pivot connection between the supporting bracket and the flapper includes: a pivot slot in a wall portion of the supporting bracket which extends perpendicularly to the plane of the valve seat, a tongue portion of the flapper engaged in the pivot slot with movement clearance, and means for retaining and positioning the flapper tongue portion in the pivot slot.

3. A filter dust ejector as defined in claim 2, wherein
the means for retaining and positioning the flapper tongue portion in the pivot slot of the supporting bracket includes a double-bend offset in the flapper tongue portion on the flapper side of the pivot slot and at least one bent-over tab extension of the tongue portion on the opposite side of the pivot slot.

4. A filter dust ejector as defined in claim 1, wherein
the check valve is so arranged that, in the absence of an exhaust flow through the ejector, the flapper is subject to a bias which holds the valve open; and
the check valve means further includes flapper stop means for limiting the flapper opening movement away from the valve seat to a valve gap which is small enough for the creation of a pressure drop, when a substantial gas flow takes place from the suction space into the suction connector, which pressure drop closes the flapper against the valve seat by overcoming said valve opening bias.

5. A filter dust ejector as defined in claim 4, wherein
the valve seat is so oriented with respect to the ejector axis and to the inlet pipe that the effect of gravity on the flapper produces said valve opening bias; and
the outer periphery of the inlet pipe serves as said flapper stop means.

6. A filter dust ejector as defined in claim 1, wherein
the check valve is so arranged that, in the absence of an exhaust flow through the ejector, the flapper assumes a floating relationship with respect to the valve seat; and
the check valve means further includes flapper stop means for limiting the flapper opening movement away from the valve seat to a valve gap which is small enough for the creation of a pressure drop, when a substantial gas flow takes place from the suction space into the suction connector, which pressure drop closes the flapper against the valve seat.

7. A filter dust ejector as defined in claim 1, wherein
the check valve is so arranged that, in the absence of an exhaust flow through the ejector, the flapper is subject to a bias which holds the valve closed; and
said valve closing bias is weak enough to allow for the opening of the valve, when, as a result of an exhaust flow through the ejector, a negative pressure is created in the suction space.

* * * * *